United States Patent

Bainbridge et al.

[11] Patent Number: 5,324,149
[45] Date of Patent: Jun. 28, 1994

[54] LIGHTWEIGHT LUG NUT

[75] Inventors: Gary R. Bainbridge, North Tonawanda; Jeffrey R. Sullivan, Boston, both of N.Y.

[73] Assignee: McGard, Inc., Orchard Park, N.Y.

[21] Appl. No.: 77,908

[22] Filed: Jun. 16, 1993

[51] Int. Cl.⁵ .............................................. F16B 37/14
[52] U.S. Cl. .................................. 411/431; 411/377; 411/405
[58] Field of Search ............... 411/427, 429, 430, 431, 411/373, 377, 910, 402, 405

[56] References Cited

U.S. PATENT DOCUMENTS

| | | | |
|---|---|---|---|
| 1,787,154 | 12/1930 | Hughes | 411/429 |
| 4,361,412 | 11/1982 | Stolarczyk | 411/402 |
| 4,850,776 | 7/1989 | Toth | 411/429 |
| 4,900,206 | 2/1990 | Kazino et al. | 411/431 X |
| 5,098,239 | 3/1992 | Thiel | 411/431 X |
| 5,180,266 | 1/1993 | Nolan et al. | 411/431 |

FOREIGN PATENT DOCUMENTS 24935  3/1981  European Pat. Off. ............ 411/431

OTHER PUBLICATIONS

The attached Kaynar catalog sheet shows a six-point nut and washer combination in which the nut portion is fluted.

*Primary Examiner*—Neill R. Wilson
*Attorney, Agent, or Firm*—Joseph P. Gastel

[57] ABSTRACT

A lightweight lug nut including a grooved body for receiving a wrench, a nose on the body for bearing against a rim, a threaded portion within the body, an enlarged bore between the threaded portion and the end of the body remote from the nose, a chamfer on the end of the body remote from the nose, a chamfered shoulder between the grooves and the nose, a plurality of teats at the remote end extending inwardly toward the enlarged bore, and a cap for mounting at the remote end and including a groove for receiving the plurality of teats.

21 Claims, 2 Drawing Sheets

LIGHTWEIGHT LUG NUT

BACKGROUND OF THE INVENTION

The present invention relates to an improved lug nut and more particularly to one which is lightweight.

By way of background, in the past lug nuts used on automotive wheels usually had a hexagonal body for receiving a wrench. However, prior lug nuts were relatively heavy, and they thus caused the unsprung weight of the wheels to be correspondingly high. It is desirable to reduce this unsprung weight by lightening lug nuts.

SUMMARY OF THE INVENTION

It is the primary object of the present invention to provide an improved lug nut which is lightweight and thereby reduces the unsprung weight of an automotive wheel with which it is associated.

Another object of the present invention is to provide an improved lightweight lug nut which includes a plurality of uniquely integrated features which contribute to its light weight without sacrificing its strength. Other objects and attendant advantages of the present invention will readily be perceived hereafter.

The present invention relates to a lightweight lug nut comprising a body having first and second ends and a central portion therebetween, a nose proximate said first end for bearing on a member, a chamfered shoulder on said central portion facing said second end, a bore in said body having a thread therein, and a fluted wrench-receiving portion between said second end and said chamfered shoulder.

The various aspects of the present invention will be more fully understood when the following portions of the specification are read in conjunction with the accompanying drawings wherein:

DESCRIPTION OF THE PREFERRED EMBODIMENTS

Summarizing briefly in advance, the lightweight lug nut of the present invention is between 10% and 20% lighter than conventional lug nuts because of the plurality of features described hereafter which contribute to its lighter weight.

Figures 1, 5, 6, 7, 8:
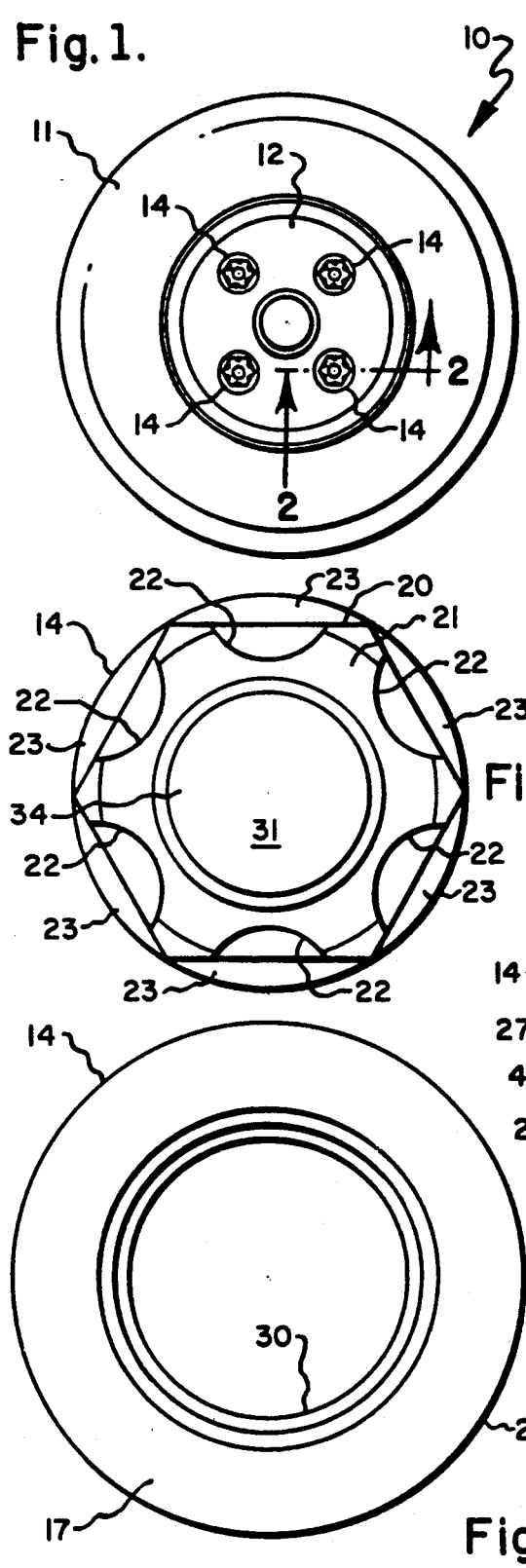
FIG. 1 is a side elevational view of an automotive wheel showing a tire mounted on a rim which is secured to the axle by a plurality of lightweight lug nuts of the present invention.
FIG. 5 is an end elevational view of the end of the lug nut taken substantially in the direction of arrows 5—5 of FIG. 3.
FIG. 6 is an end elevational view of the nose end of the lug nut taken substantially in the direction of arrows 6—6 of FIG. 4.
FIG. 7 is a fragmentary enlarged cross sectional view of the end portion of FIG. 4 and showing a plastic cap inserted into the open end of the lug nut.
FIG. 8 is an end elevational view taken substantially in the direction of arrows 8—8 of FIG. 7 and showing the plastic cap in position on the end of the lug nut.
Figure 2:
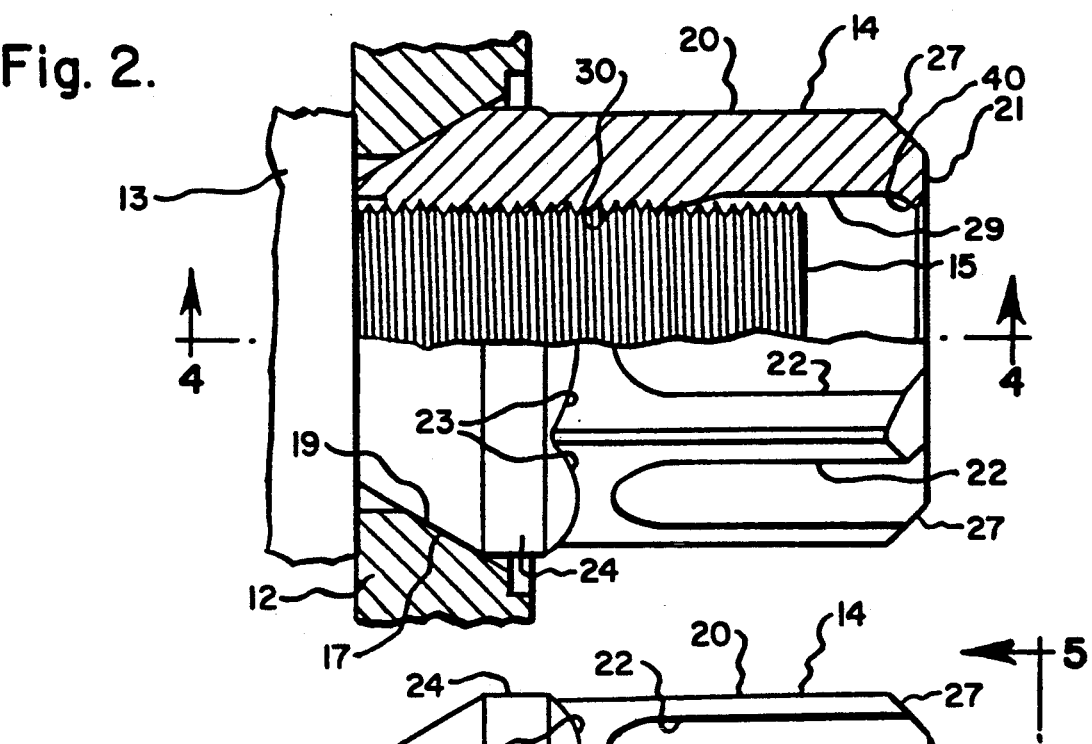
FIG. 2 is a fragmentary cross sectional view taken substantially along line 2—2 of FIG. 1 and showing the lug nut mounted on an associated stud.
Figure 3:
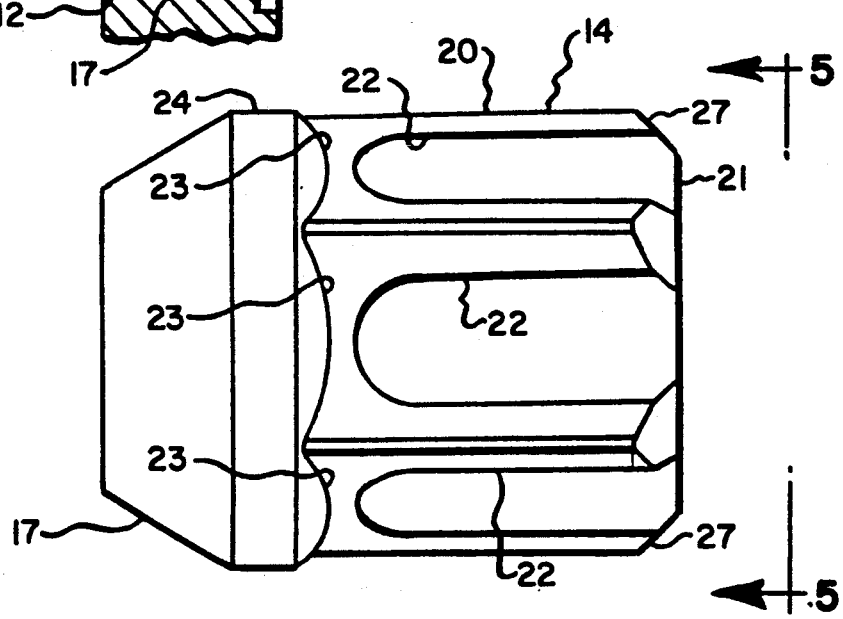
FIG. 3 is a side elevational view of the lightweight lug nut.
Figure 4:
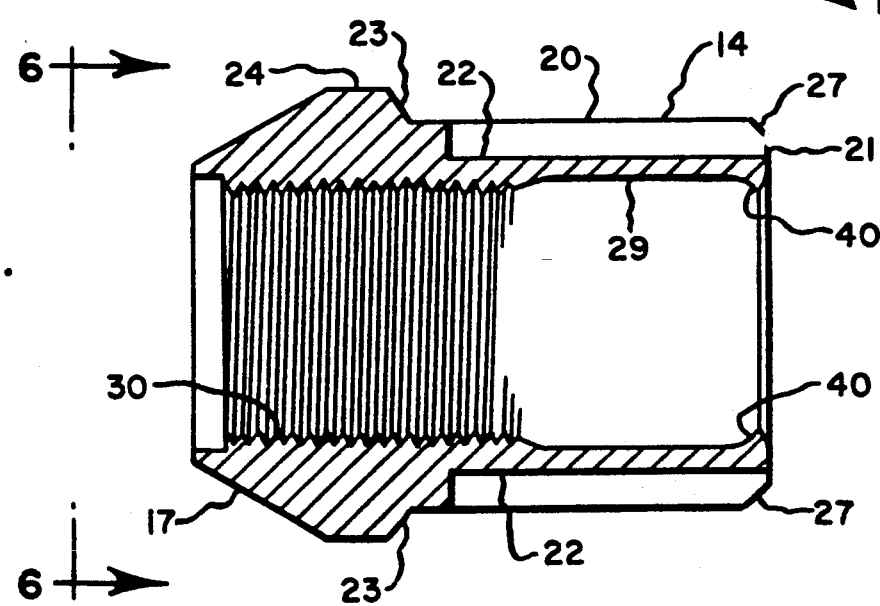
FIG. 4 is a cross sectional view taken substantially along line 4—4 of FIG. 2 with the stud removed.

In FIG. 1 an automotive wheel 10 is shown consisting of a tire 11 mounted on rim 12 which is secured to axle 13 by a plurality of lightweight lug nuts 14 which are threadably mounted on lugs 15 extending outwardly from axle 13. A frustoconical nose 17 of each lug nut bears against a mating frustoconical surface 19 of the rim 12.

Each lug nut 14 includes a body 20 having a longitudinal axis and above-mentioned frustoconical nose 17 at one end and a remote end 21 and a central portion therebetween. A plurality of grooves 22 are formed in body 20 and they extend from the remote end 21 toward the chamfered or curved shoulder surfaces 23 which merge into enlarged cylindrical portion 24 which in turn merges into frustoconical portion 17. If grooves 22 were not present, that is, if the body 20 was not fluted the aforementioned body portion extending inwardly from remote end 21 would be hexagonal. However, the forming of grooves 22 removes an amount of material from the sides of an otherwise hexagonal configuration to thus contribute toward lightening the nut. However, ridges 24 still remain between the grooves 22 so that the existing configuration is still essentially hexagonal for receiving a conventional hexagonal wrench with which nut 14 is turned.

The chamfered or curved shoulder surfaces 23 are formed in this manner rather than in the shape of a shoulder which extends perpendicularly to the axis of the nut to thereby lessen the amount of material in the nut and thus reduce its weight in this regard. The curved shoulder surfaces 23 serve the same function as the aforementioned perpendicular shoulder, namely, to act as a stop for a wrench which is applied to the nut.

In addition to the lightening of the lug nut by the formation of grooves 22 and curved shoulder surfaces 23, the nut 14 is further lightened by chamfering the remote ends at 27 at the ends of the ridges 24. This chamfering, in addition to lightening nut 14 over the weight of a conventional hexagonal body, also provides an inclined surface for facilitating the mounting of a wrench onto body 20.

The nut 14 is further lightened over that of a conventional nut by enlarging the bore portion 29 which lies between the threaded portion 30 and remote end 21. In other words, the threads end where enlarged portion 29 begins, and the amount of threads 30 is calculated to provide sufficient engagement with stud 15. While this feature, that is the enlarged portion 29, is also present in conventional nuts where the threads, such as 30, terminate before reaching remote end 21, the fact remains that the enlargement of portion 29 does contribute toward lightening nut 14.

When studs 15 extend outwardly beyond the remote end 21, a cap is not utilized with nut 14. However, in certain instances the lug 15 is located within nut 14 when the nut is fully tightened. In such instances, it is desirable to provide a cap or closure 31 for sealing the remote end 21 both for preventing entry of foreign matter and also for improving the appearance. Accordingly, a molded plastic cap 31 is provided which has an annular lip 32 at one end of cylindrical portion 33 and a cap portion 34 at eh opposite end of cylindrical portion 33. Cap 31 is sufficiently flexible so that annular lip 32 can be inserted into enlarged bore 29. In this respect, the extreme edge 35 of lip 32 is chamfered to provide a camming action. The groove 37 which is located between lip 32 and shoulder 39 receives the teats 40 (FIG. 5) which are formed at remote end 21 by an upsetting action. In this respect, it can be seen that the portions 41 at the remote end which lie radially inwardly of grooves 22 are thinner than the portions 42 which lie between the grooves 22. Therefore, when the remote end 21 is upset, teats 40 are formed. It is these teats which are received in annular groove 37 of cap 31 to retain the latter in position with its shoulder 39 abutting remote end 21. If it is desired to remove cap 31, it is only necessary to pull it out of bore 29, and this is facilitated by the chamfer 43 on lip 32.

While preferred embodiments of the present invention have been disclosed, it will be appreciated that it is not limited thereto but may be otherwise embodied within the scope of the following claims.

What is claimed is:

1. A lightweight lug nut comprising a body having first and second ends and a central portion therebetween, a shoulder on said central portion, a nose proximate said first end for bearing on a member, a wrench-receiving portion between said second end and said shoulder, sides on said wrench-receiving portion, grooves in said sides of said wrench-receiving portion, ridges between said grooves for being received in turning engagement by a wrench, a bore in said body having a thread with a predetermined root diameter extending from said first end partially toward said second end, and a second bore in said body which is of larger diameter than said root diameter of said thread extending between said second end and said thread.

2. A lightweight lug nut as set forth in claim 1 wherein said body is chamfered at said second end.

3. A lightweight lug nut as set forth in claim 1 including a chamfer on said shoulder facing said second end.

4. A lightweight lug nut as set forth in claim 3 wherein said body is chamfered at said second end.

5. A lightweight lug nut comprising a body having first and second ends and a central portion therebetween, a nose proximate said first end for bearing on a member, a chamfered shoulder on said central portion facing said second end, a bore in said body having a thread therein, a wrench-receiving portion between said second end and said chamfered shoulder, sides on said wrench-receiving portion, grooves in said sides of said wrench-receiving portion, and ridges between said grooves for being received in turning engagement by a wrench.

6. A lightweight lug nut as set forth in claim 5 wherein body is chamfered at said second end.

7. A lightweight lug nut comprising a body having first and second ends and a central portion therebetween, a shoulder on said central portion, a nose proximate said first end for bearing on a member, a fluted wrench-receiving portion between said second end and said shoulder, a bore in said body having a thread with a predetermined root diameter extending from said first end partially toward said second end, a second bore in said body which is of larger diameter than said root diameter of said thread extending between said second end and said thread, and a plurality of teats extending inwardly into said second bore at said second end.

8. A lightweight lug nut as set forth in claim 7 including a cap, a rim on said cap, an external portion on said cap having a shoulder for placement in contiguous relationship to said second end, and a groove between said rim and said shoulder for receiving said teats.

9. A lightweight lug nut as set forth in claim 6 wherein said body is chamfered at said second end.

10. A lightweight lug nut as set forth in claim 7 including a chamfer on said shoulder facing said second end.

11. A lightweight lug nut as set forth in claim 6 including a chamfer on said shoulder facing said second end.

12. A lightweight lug nut as set forth in claim 7 wherein said body has a longitudinal axis, and wherein said fluted wrench-receiving portion has grooves therein, and wherein said grooves extend longitudinally of said longitudinal axis.

13. A lightweight lug nut as set forth in claim 18 including a chamfer on said body at said second end, and wherein said grooves extend substantially the entire distance between said chamfer on said second end and said shoulder.

14. A lightweight lug nut comprising a body having first and second ends and a central portion therebetween, a nose proximate said first end for bearing on a member, a chamfered shoulder on said central portion facing said second end, a bore in said body having a thread therein, a fluted wrench-receiving portion between said second end and said chamfered shoulder, and a plurality of teats extending inwardly into said bore at said second end.

15. A lightweight lug nut as set forth in claim 17 wherein said body is chamfered at said second end.

16. A lightweight lug nut as set forth in claim 14 including a cap, a rim on said cap, an external portion on said cap having a shoulder for placement in contiguous relationship to said second end, and a groove between said rim and said shoulder for receiving said teats.

17. A lightweight lug nut as set forth in claim 14 wherein said second end of said body is chamfered at said second end.

18. A lightweight lug nut as set forth in claim 14 wherein said body has a longitudinal axis, and wherein said fluted wrench-receiving portion has grooves therein, and wherein said grooves extend longitudinally of said longitudinal axis.

19. A lightweight lug nut as set forth in claim 18 including a chamfer on said body at said second end, and wherein said grooves extend substantially the entire distance between said chamfer on said second end and said chamfered shoulder.

20. A lightweight lug nut comprising a body having first and second ends and a central portion therebetween, a nose proximate said first end for bearing on a member, a shoulder on said central portion facing said second end, a bore in said body having a thread therein, a fluted wrench-receiving portion between said second end and said shoulder, and a plurality of teats extending inwardly into said bore at said second end.

21. A lightweight lug nut as set forth in claim 20 including a cap, a rim on said cap, an external portion on said cap having a shoulder for placement in contiguous relationship to said second end, and a groove between said rim and said shoulder for receiving said teats.

* * * * *

UNITED STATES PATENT AND TRADEMARK OFFICE
CERTIFICATE OF CORRECTION

PATENT NO. : 5,324,149
DATED : June 28, 1994
INVENTOR(S) : Gary R. Bainbridge et al It is certified that error appears in the above-indentified patent and that said Letters Patent is hereby corrected as shown below:

Column 2, line 11, after "and" insert --the--;

line 64, change "eh" to --the--.

Column 3, line 50 (claim 6), after "wherein" insert --said--.

Column 4, line 4 (claim 9), change "6" to --8--;

line 6 (claim 10), change "7" to --9--;

line 9 (claim 11), change "6" to --8--;

line 17 (claim 13), change "18" to --12--;

line 31 (claim 15), change "17" to --14--;

line 38 (claim 17), change "14" to --16--.

Signed and Sealed this

Twenty-seventh Day of September, 1994

Attest:

BRUCE LEHMAN

*Attesting Officer*      *Commissioner of Patents and Trademarks*